(12) United States Patent
Miyawaki et al.

(10) Patent No.: US 7,258,577 B2
(45) Date of Patent: Aug. 21, 2007

(54) MEMORY PACK

(75) Inventors: Chikanori Miyawaki, Neyagawa (JP); Mikiya Ueda, Kobe (JP); Yoshiaki Akutagawa, Kadoma (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 10/571,072

(22) PCT Filed: Sep. 6, 2004

(86) PCT No.: PCT/JP2004/013273

§ 371 (c)(1),
(2), (4) Date: Mar. 8, 2006

(87) PCT Pub. No.: WO2005/027028

PCT Pub. Date: Mar. 24, 2005

(65) Prior Publication Data

US 2007/0004281 A1    Jan. 4, 2007

(30) Foreign Application Priority Data

Sep. 11, 2003    (JP)    ............... 2003-319376

(51) Int. Cl.
*H01R 24/00*    (2006.01)
(52) U.S. Cl. ............. 439/630; 439/260; 439/149; 235/441
(58) Field of Classification Search ........ 439/630–633, 439/260, 149; 235/441
See application file for complete search history.

(56) References Cited

U.S. PATENT DOCUMENTS 6,409,546 B1 *    6/2002    Ito et al. ............... 439/630
6,607,404 B1 *    8/2003    Ito et al. ............... 439/630

FOREIGN PATENT DOCUMENTS

| JP | 09-102019   | 4/1997  |
| JP | 2002-329553 | 11/2002 |
| JP | 2003-059557 | 2/2003  |
| JP | 2003-099726 | 4/2003  |

\* cited by examiner

*Primary Examiner*—Truc Nguyen
(74) *Attorney, Agent, or Firm*—Steptoe & Johnson LLP

(57) ABSTRACT

The present invention provides a thin connector in which contacts to be brought into contact with terminals of a memory card are less liable to be deformed when the connector is assembled or an external force is exerted on the connector. The contacts (4) are located at a lower level than upper surfaces of protective projections (3a), and distal ends of the contacts (4) are located at a higher level than lower surfaces of the protective projections (3a). This prevents the deformation of the contacts, and allows the connector to have a smaller thickness. Further, the contacts are located at a lower level than the upper surfaces of the protective projections when the protective projections are deformed to be brought into contact with bottom portions of recesses of the memory card. Thus, the contacts are less liable to be deformed by an external force.

8 Claims, 13 Drawing Sheets

MEMORY PACK

The present application is based on International Application PCT/JP2004/013273, filed Sep. 6, 2004, which application is incorporated herein by reference in its entirety.

TECHNICAL FIELD

The present invention relates to a memory pack for use in a portable information processing device or the like.

BACKGROUND ART

In recent years, the capacities of the flash memories have been increased, and adaptors removably attached to various types of memory cards, memory packs incorporating one or more memory cards and other information processing devices mounted with memories have been developed.

There have been known various structures of the memory packs for incorporating a memory card such as a PC card. Further, inventions have been made to meet a demand for reduction of the thickness of the PC card.

In general, terminals of the memory card are connected to an electric circuit provided in the memory pack via a connector. For example, an IC card connector having the smallest possible thickness yet having a sufficient mechanical strength is known (see, for example, JP 2002-329553A). The IC card connector is adapted to receive an SD card as the IC card inserted therein with terminals of the SD card facing up, and includes a plurality of connection terminals embedded in a base thereof to be brought into contact with electrode pads of the terminals of the SD card.

Further, a PC card including a plurality of memory cards is known (see, for example, JP 9-102019A).

FIGS. 10 to 13 illustrate an example of a prior art memory pack of a PC card size. FIG. 10 is a perspective view of the memory pack with its upper cover removed, and FIG. 11 is a perspective view of a printed board and a connector. FIG. 12 is an explanatory diagram for assembling, and FIG. 13 is a sectional view taken along a line X-X in FIG. 10.

In FIGS. 10 to 13, a reference numeral 100 denotes a frame having a bottom and a housing space. A reference numeral 101 denotes an upper cover of a thin rectangular metal plate which is combined with the frame 100 to define a housing. In general, the upper cover 101 is fixed to the frame 100 by a snap-in or fusion bonding method or with the use of screws. A reference numeral 102 denotes a printed board, which is fixed in the housing space of the frame 100 with the use of an adhesive or screws. An electronic component 108 such as a control LSI is mounted on a rear surface of the printed board 102. A reference numeral 103 denotes a pair of connector bases, which are composed of an insulator such as a resin and disposed in a middle portion of the printed board 102 as extending widthwise of the printed board in parallel relation. The bases 103 each have a plurality of recesses extending widthwise thereof and arranged at predetermined intervals in parallel relation. A reference numeral 104 denotes contacts, which are composed of gold-plated phosphor bronze or beryllium copper and fitted in the recesses of the bases 103 at a predetermined pitch in parallel relation. One-end portions of the contacts 104 project from the corresponding bases 103 to overhang the printed board 102. The other ends of the contacts 104 are electrically connected to a circuit pattern (not shown) formed on the printed board 102 to form a predetermined electric circuit. The connector is constituted by the bases 103 and the contacts 104.

A reference numeral 105 denotes memory cards. In this example, four SD memory cards are used, and accommodated in the housing of the PC card. A reference character 105a denotes a plurality of recesses formed in an edge portion of each of the memory cards 105 and arranged at the same pitch as the contacts 104. Terminals 105b are respectively provided on bottom surfaces of the recesses 105a, and brought into contact with the contacts 104 for electrical connection. A reference numeral 106 denotes a card connector, which is mounted on the printed board 102 and permits signal transmission with respect to an external device. A reference numeral 107 denotes a ground plate, which covers the card connector 106 for reduction of influences of noise.

When the memory pack is assembled, the connector with the plurality of contacts 104 preliminarily attached to the bases 103 thereof is fixed to the printed board 102 as shown in FIG. 11. Then, as shown in FIG. 12, two front memory cards 105 are inserted in an arrow direction A and the other two memory cards 105 are inserted in an arrow direction B toward the bases 103 of the connector. With terminal-side edges of the memory cards 105 abutting against walls of the, bases 103, the contacts 104 are in contact with the terminals 105b of the memory cards. As shown in FIG. 10, the resulting unit is fixed in the frame 100, and the upper cover 101 is attached to the frame 100.

In the prior art, however, the contacts 104 project from the bases 103 in an uncovered state as shown in FIG. 11. Therefore, when the connector is transported or attached to the board 102 or the memory cards 105 are inserted into the connector, the contacts 104 of the connector are liable to be deformed in contact with various things. This may result in insufficient contact between the contacts 104 and the terminals 105b of the memory cards 105.

DISCLOSURE OF THE INVENTION

In view of the foregoing, it is an object of the present invention to provide a thin memory pack which includes a connector mounted therein and is capable of preventing deformation of contacts of the connector when the connector is transported or assembled or memory cards are inserted into the connector.

According to the present invention to solve the aforesaid problem, there is provided a memory pack, which comprises: a frame defining a housing; a printed board fixed in the frame; a connector including a base fixed to the printed board and a plurality of contacts projecting, from the base, generally parallel to the printed board and arranged at a predetermined pitch in parallel relation; protective projections provided, on the base, generally parallel to the contacts in the vicinity of the contacts in such a manner as to permit vertical movement of the contacts; and at least one memory card disposed on the printed board with terminals thereof facing up in contact with the contacts, wherein the contacts are located at a lower level than upper surfaces of the protective projections and distal ends of the contacts are located at a higher level than lower surfaces of the protective projections.

In the inventive memory pack, the protective projections are provided in the vicinity of the contacts which are in contact with the terminals of the memory card disposed in the memory pack. Therefore, when the memory pack is transported or assembled or the memory card is inserted into the connector, the contacts are less liable to be brought into contact with other components thereby to be prevented from being deformed.

The contacts are located at a lower level than the upper surfaces of the protective projections when the protective projections are deformed toward the printed board into abutment against bottom portions of recesses of the memory card.

As described above, the contacts do not project upward from the upper surfaces of the protective projections, even if an external force is applied to the protective projections to press and deform the protective projections. Therefore, no force is exerted on the contacts, so that deformation of the contacts can be effectively prevented.

BEST MODE FOR IMPLEMENTING THE INVENTION

Figure 1:
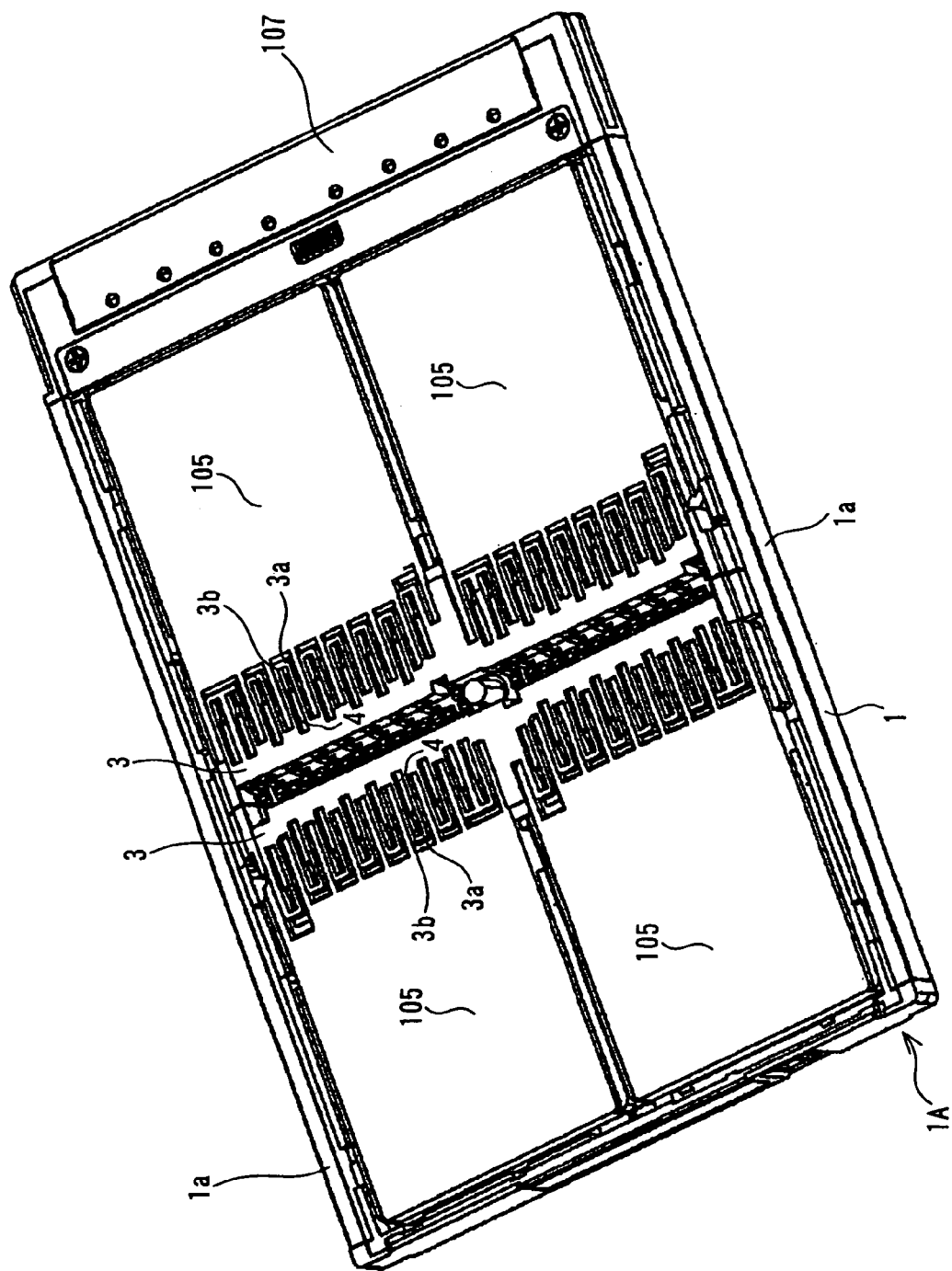
FIG. 1 is a perspective view of an inventive memory pack with its upper cover removed.

According to a first aspect of the present invention, there is provided a memory pack, which comprises: a frame defining a housing; a printed board fixed in the frame; a connector including a base fixed to the printed board and a plurality of contacts projecting from the base generally parallel to the printed board and arranged at a predetermined pitch in parallel relation; protective projections provided on the base generally parallel to the contacts in the vicinity of the contacts in such a manner as to permit vertical movement of the contacts; and at least one memory card disposed on the printed board with terminals thereof facing up in contact with the contacts, wherein the contacts are located at a lower level than upper surfaces of the protective projections and distal ends of the contacts are located at a higher level than lower surfaces of the protective projections. The protective projections are provided in the vicinity of the contacts. Therefore, when the memory pack is transported or assembled or the memory card is inserted into the connector, the contacts are less liable to be brought into contact with other components thereby to be prevented from being deformed. Since the protective projections are integral with the base, the contacts can be accurately located in proper vertical positional relation with respect to the protective projections.

According to a second aspect of the present invention, there is provided a memory pack, which comprises: a frame defining a housing; a printed board fixed in the frame; a connector including a base fixed to a generally middle portion of the printed board and contacts projecting from the base generally parallel to the printed board longitudinally of the printed board and arranged at a predetermined pitch in parallel relation; protective projections provided integrally with the base generally parallel to the contacts in the vicinity of the contacts in such a manner as to permit vertical movement of the contacts; and at most two pairs of memory cards disposed on opposite sides of the connector on the printed board with terminals thereof facing up in contact with the contacts, wherein the contacts are located at a lower level than upper surfaces of the protective projections and distal ends of the contacts are located at a higher level than lower surfaces of the protective projections. In the memory pack in which at most four memory cards are mountable, the protective projections are disposed in the vicinity of the contacts. Therefore, when the memory pack is transported or assembled or the memory cards are inserted into the connector, the contacts are less liable to be brought into contact with other components thereby to be prevented from being deformed. Since the protective projections are provided integrally with the base, the contacts can be accurately located in proper vertical positional relation with respect to the protective projections.

According to a third aspect of the present invention, the terminals of the memory card are provided in bottom portions of recesses formed in the memory card at a lower level than the upper surface of the memory card, and the protective projections each have a smaller width than the recesses, and are configured such that a height of the lower surfaces of the protective projections as measured from the printed board is greater than a height of the terminals as measured from a lower surface of the memory card. With this arrangement, the protective projections are engageable with the recesses of the memory card. This makes it possible to reduce the height of the protective projections.

According to a fourth aspect of the present invention, the contacts are located at a lower level than the upper surfaces of the protective projections when the protective projections are deformed toward the printed board into abutment against the bottom portions of the recesses of the memory card. With this arrangement, the contacts are located at a lower level than the upper surfaces of the protective projections even if an external force is applied to the protective projections to deform the protective projections. Therefore, no force is exerted on the contacts, so that the deformation of the contacts can be prevented. Thus, the contacts are stably kept in contact with the terminals.

According to a fifth aspect of the present invention, the protective projections respectively have holes, and the contacts provided on the base are disposed in the respective holes in a vertically movable manner. According to a sixth aspect of the present invention, the protective projections each have a U-shape to surround the respective contacts. With this arrangement, the contacts respectively provided in the holes of the protective projections are perfectly protected by the protective projections.

EMBODIMENTS

An embodiment of the present invention will hereinafter be described with reference to FIGS. 1 to 7. Components denoted by the same reference characters as in the prior art have the same structures as in the prior art, and will not be explained in detail.

Figure 2:
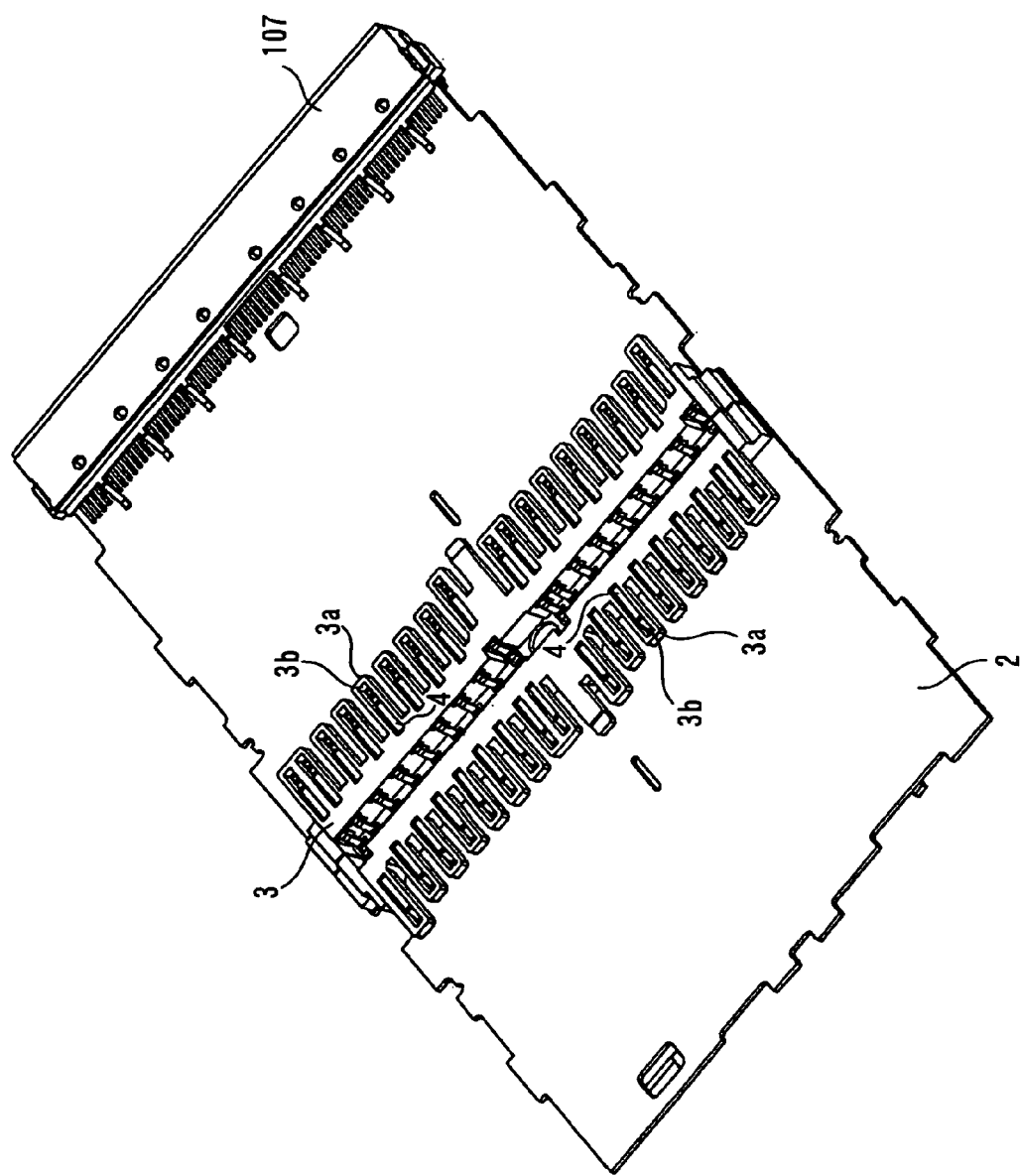
FIG. 2 is a perspective view of a printed board and a connector according to the invention.

First, the construction of a connector of a memory pack according to this embodiment will be described. The memory pack according to this embodiment is a PC card in which four SD memory cards are mounted. FIG. 1 is a perspective view illustrating the inventive memory pack with its upper cover removed. FIG. 2 is a perspective view illustrating the connector fixed on a printed board.

In FIGS. 1 and 2, a frame 1 is formed of a resin, or produced by metal plate working or die casting. The frame 1 is combined with an upper cover not shown to define a housing of the PC card. A main body 1A of the frame 1 includes frame portions 1a provided on opposite sides thereof as a framework and a bottom portion provided between the frame portions 1a to define a housing space in which the printed board 2 is housed. The upper cover 10 has the same construction as in the prior art, and fixed to the frame 1 in the same manner as in the prior art.

An electronic component such as a control LSI is mounted on a rear surface of the printed board 2 as in the prior art. The connector includes two bases 3 spaced a predetermined distance from each other in parallel relation and fixed to a generally middle portion of an upper surface of the printed board 2. The bases are composed of a resin material such as a liquid crystal polymer, PPS or PBT which is heat resistant, highly rigid and insulative.

Contacts 4 are rectangular thin plates composed of gold-plated phosphor bronze or beryllium copper as in the prior art and having a predetermined configuration. The contacts 4 are attached to the bases of the connector and arranged at a predetermined pitch in parallel relation as projecting longitudinally of the printed board 2 from the bases 3 generally parallel to the printed board 2. The bases 3 have fixing holes 3f for fixing the contacts 4 to the bases. The contacts 4 are press-fitted in the fixing holes 3f, or inserted in the fixing holes 3f and fixed by clogging the fixing holes 3f with spacers. The method for fixing the contacts 4 to the bases 3 is not limited to the aforesaid method. The contacts 4 may be insert-molded in the bases 3. One-end portions of the contacts 4 fixed to the bases 3 project from the bases 3 to overhang the printed board 2 (see FIG. 5). The one-end portions of the contacts 4 are curved downward so as to be easily brought into contact with terminals 105b. The other end portions of the contacts 4 are bent perpendicularly for electrical connection to a circuit pattern 2a formed on the printed board 2 to form en electric circuit.

Protective projections 3a are of an elongated U-shape, and each have a hole 3b. The protective projections 3a each have a thickness and a width sufficient to withstand a certain pressure. The protective projections 3a are provided integrally on the bases 3, and project from the bases 3 parallel to the printed board 2 longitudinally of the printed board 2. The protective projections 3a are arranged generally parallel to the contacts 4, and respectively surround the contacts 4. The contacts 4 are located at a lower level than upper surfaces 3d of the protective projections 3a. The downwardly curved one-end portions of the contacts 4 project from lower surfaces 3e of the protective projections.

The holes 3b of the protective projections 3a each have a greater width than the contacts 4, and a greater length than the one-end portions of the contacts 4. Therefore, the contacts 4 are vertically movable within the holes 3b. The protective projections 3a are formed integrally with the bases 3, and the contacts 4 are firmly fixed to the bases 3 in engagement with the fixing holes 3f preliminarily formed in the bases 3. Therefore, the contacts 4 are accurately located in proper vertical positional relation with respect to the protective projections 3a.

Since the connector has the protective projections 3a as described above, the contacts 4 are prevented from being brought into direct contact with foreign matter. Therefore, when the connector is transported or attached to the board, the contacts 4 are less liable to be deformed.

Figure 4:
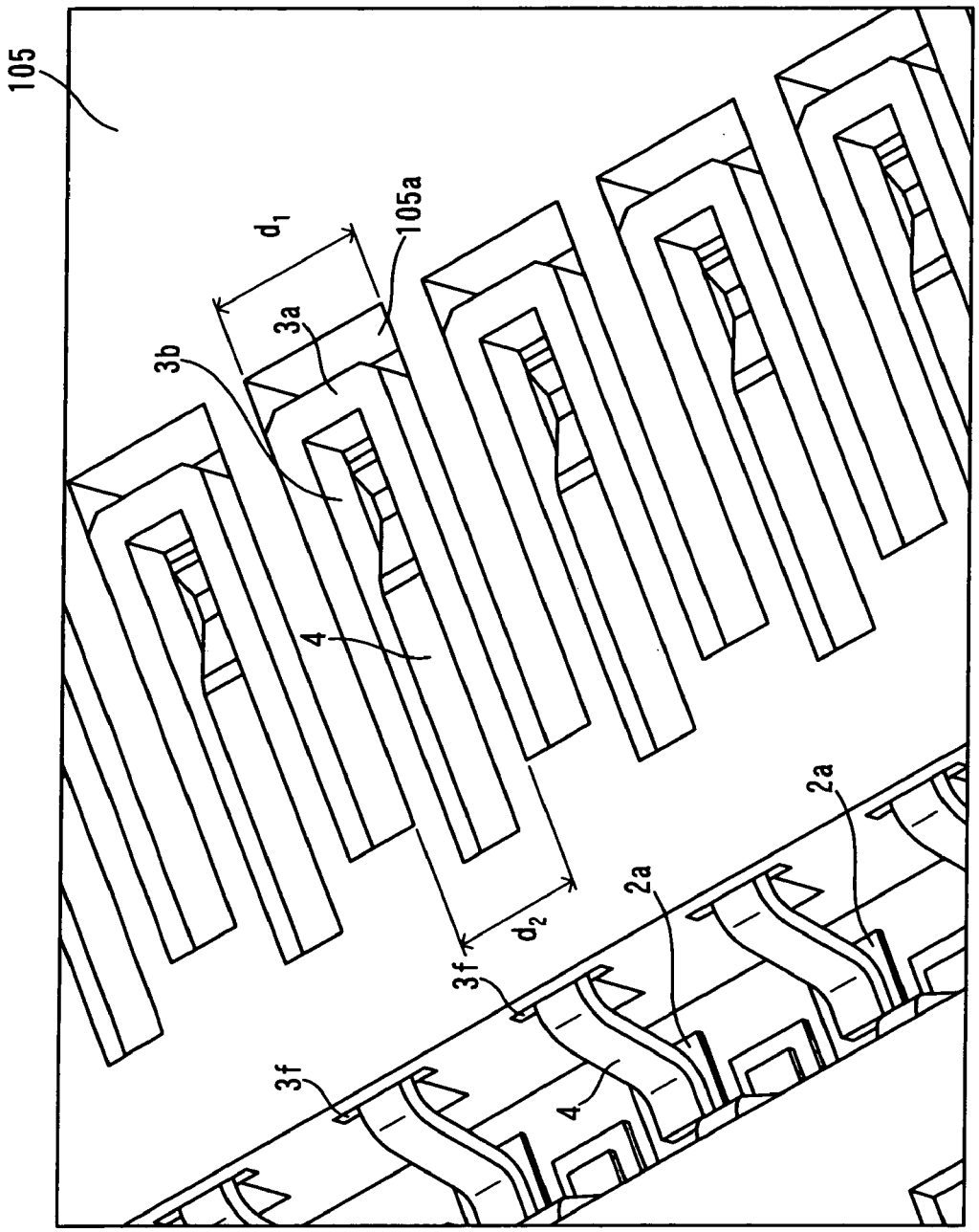
FIG. 4 is a partial enlarged view of contacts according to the invention.

How to assemble the memory pack will hereinafter be explained. For the assembling of the memory pack, the contacts 4 are inserted into the fixing holes 3f formed in the bases 3 thereby to be fixed to the bases 3. Thus, the connector is prepared. Then, the bases 3 are fixed to the upper surface of the printed board 2 preliminarily mounted with the electronic component, and the other end portions of the contacts 4 are connected to the pattern 2a formed on the printed board 2 as shown in FIG. 4 by a surface mounting method or the like.

Figure 3:
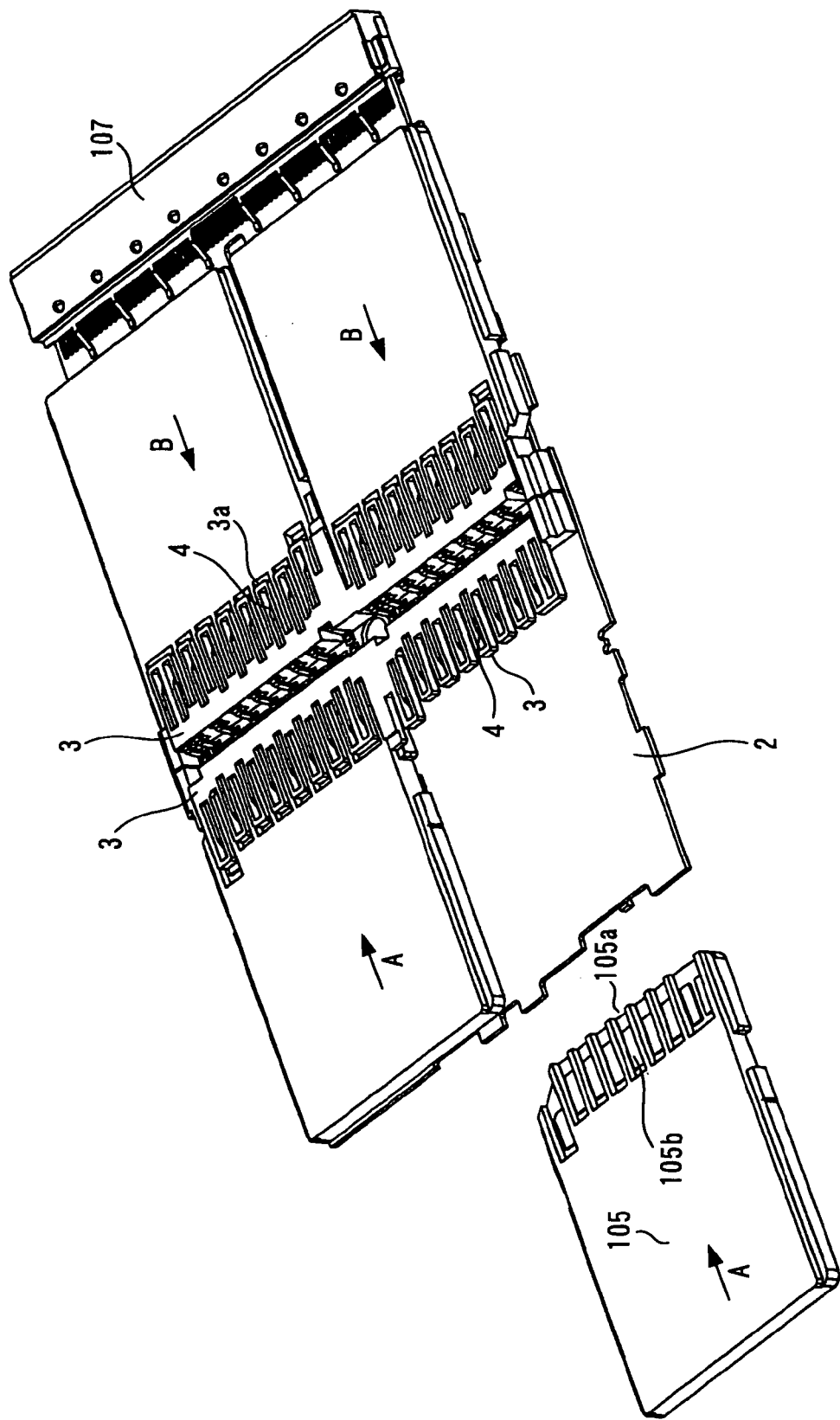
FIG. 3 is an explanatory diagram for assembling the inventive memory pack.

In turn, the memory cards 105 are inserted toward the bases 3 of the connector along the printed board 2 with the terminals thereof facing up. In this embodiment, the memory cards 105 are SD memory cards. FIG. 3 is an explanatory diagram for the assembling. The two front memory cards are inserted in an arrow direction A, and the other two memory cards are inserted in an arrow direction B. With distal edges of the inserted memory cards 105 abutting against the bases 3, the terminals 105b of the memory cards are in contact with the contacts 4. Even if the memory card 105 to be inserted into the connector is slightly offset upward from the printed board 2, the lower surfaces 3e of the protective projections 3a serve as a guide and, therefore, the memory card 105 can be inserted into the connector in sliding contact with the lower surfaces 3e of the protective projections 3a.

Figure 5:
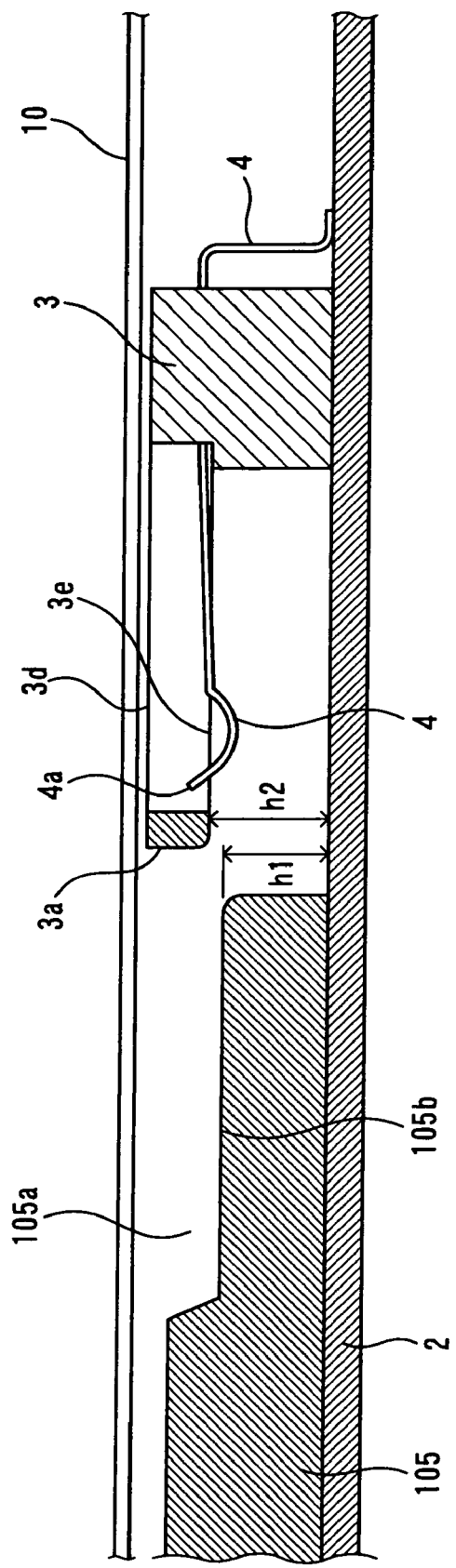
FIG. 5 is a sectional view of the contact with a memory card not inserted according to the invention.
Figure 6:
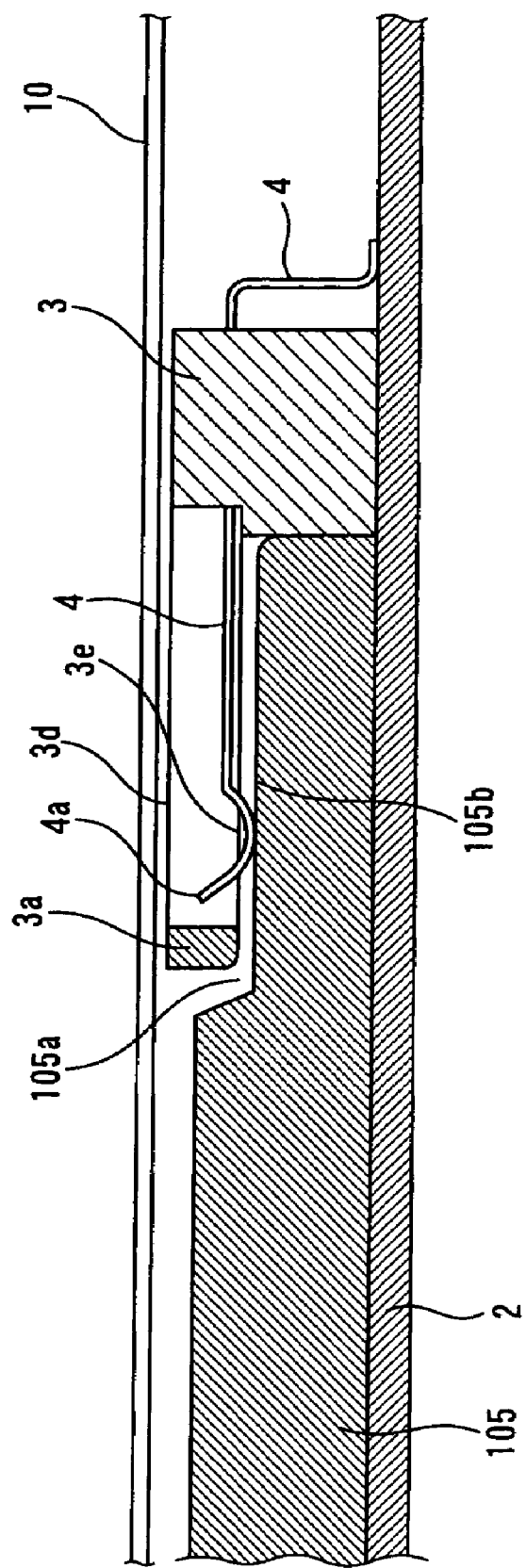
FIG. 6 is a sectional view of the contact with the memory card inserted according to the invention.

Next, a relationship between the connector and the memory card in the memory pack according to this embodiment will be explained. FIG. 4 is a partial enlarged view of the contacts with the memory card inserted. FIG. 5 is a sectional view of the memory pack with the memory card not inserted, and FIG. 6 is a sectional view of the memory pack with the memory card inserted. In FIGS. 4 to 6, the terminals 105b of the SD memory card are provided on bottom surfaces of recesses 105a which are located at a lower level than an upper surface of the SD memory card. Here, the following expressions (1) and (2) are satisfied:

$$d2 < d1 \tag{1}$$

$$h2 > h1 \tag{2}$$

wherein d1 is the width of the recesses 105a of the memory card 105, h1 is the height of the terminals 105b of the memory card 105 as measured from a lower surface of the memory card 105, d2 is the width of the protective projections 3a, and h2 is the height of the lower surfaces 3e of the protective projections as measured from the printed board 2.

By adjusting the width of the protective projections 3a and the height of the lower surfaces of the protective projections 3a to satisfy the expressions (1) and (2), the protective projections 3a are made engageable with the terminals 105b of the memory card 105.

In FIG. 5, the level of distal ends 4a of the contacts 4 is higher than the level (h2) of the lower surfaces 3e of the protective projections 3a as measured from the printed board 2, and lower than the upper surface 3d of the protective projections 3a. With this arrangement, the memory card 105 can be inserted into the connector along the lower surfaces 3e of the protective projections 3a even if the memory card 105 is offset slightly upward when inserted. Since the distal ends 4a of the contacts are located at a higher level than the lower surfaces of the protective projections 3a, the distal ends 4a of the contacts are prevented from being caught by the distal edge of the memory card 105. Thus, the deformation of the contacts 4 is prevented. If the memory card 105 is significantly vertically offset when inserted, the distal edge of the memory card 105 abuts against distal ends of the protective projections 3a to prevent the insertion of the memory card 105. In this case, no force acts on the contacts 4, because the contacts 4 are located inside the protective projections 3a. Thus, the deformation of the contacts is prevented. The distal edges of the lower surfaces of the protective projections 3a may be chambered to be rounded to ensure easier insertion of the memory card 105.

The aforesaid arrangement prevents the deformation of the contacts 4 when the memory card 105 is inserted into the connector. By fitting the protective projections 3a surrounding the contacts 4 in the recesses 105a, the protective projections 3a are partly or entirely located at a lower level than the upper surface of the memory card 105. As a result, the connector is allowed to have a reduced thickness.

Figure 7:
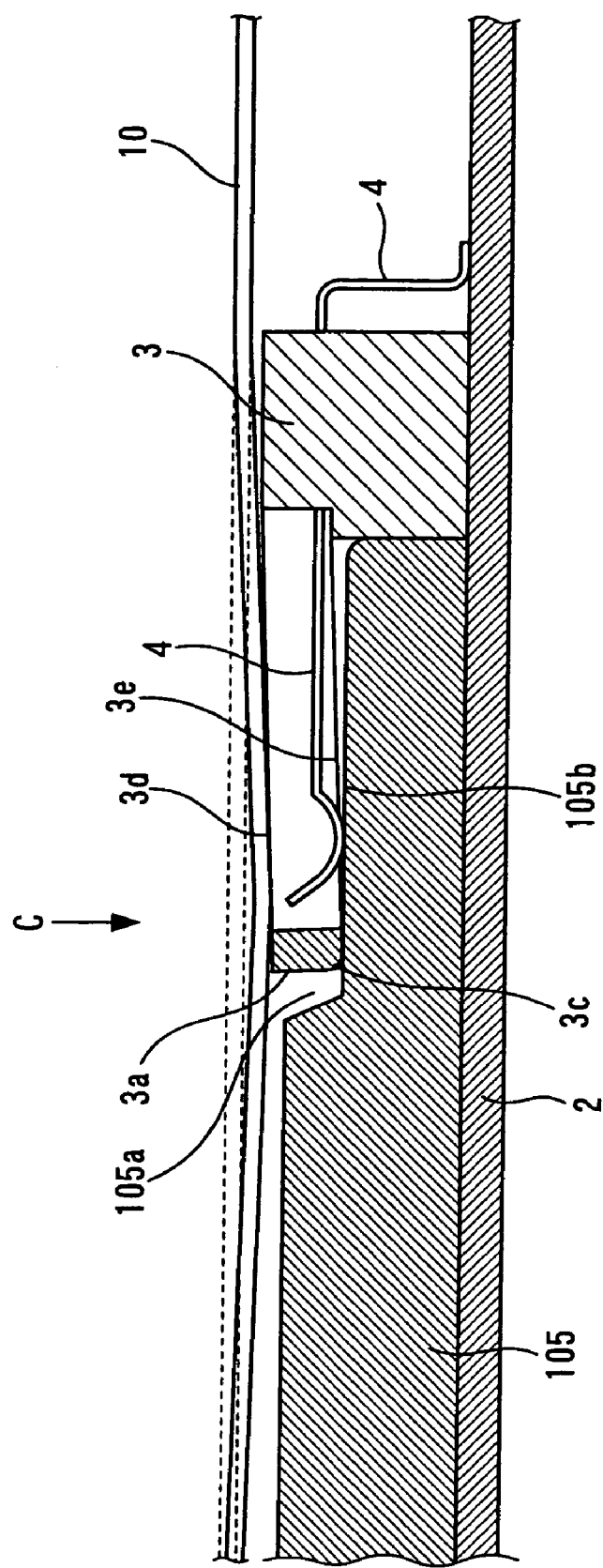
FIG. 7 is a diagram for explaining a state in which an external force acts on the contacts according to the invention.

Next, a case where an external force is applied from the upper side of the memory pack will be described with reference to FIG. 7. In FIG. 7, a reference numeral 10 denotes the upper cover, which is typically formed of a metal plate or a resin. In this embodiment, the housing of the memory pack conforms to the PC Card Standard. In general, the thickness of the PC card is specified by the standard. A type-II PC card, for example, is required to have a thickness of 5 mm at the maximum. Where the printed board 2 mounted with the electronic component, the memory cards 105 and the like are incorporated in the PC card as in this embodiment, the upper cover 10 is generally required to have a smaller thickness. Therefore, it is difficult for the upper cover to have a sufficient strength and rigidity. When an external force acts in an arrow direction C as shown in FIG. 7, the upper cover 10 is liable to be deformed downward (i.e., toward the printed board 2). If the contacts 4 were exposed without the provision of the protective projections 3a, the contacts would be pressed down to be deformed by the upper cover 10 significantly deformed downward. As a result, the contacts 4 would insufficiently contact the terminals 105b of the memory card, failing to ensure the normal operation of the memory card.

On the contrary, the protective projections 3a are provided integrally with the base 3 as shown in FIG. 7 in this embodiment. When the upper cover 10 is deformed downward, the lower surface of the upper cover 10 presses the upper surfaces 3d of the protective projections 3a. This is because the upper surfaces 3d are located at a higher level than the contacts 4. The protective projections 3a, which are composed of the resin, are resiliently deformable within a certain range. That is, the distal end portions of the protective projections 3a are deformed counterclockwise (as seen in FIG. 7) about proximal ends of the protective projections 3a, so that distal end lower portions 3c of the protective projections 3a are brought into abutment against the bottom surfaces of the recesses 105a of the memory card 105. Gaps between the lower surfaces 3e of the protective projections 3a and the bottom surfaces of the recesses 105a of the memory card 105 are defined so as not to permit permanent deformation of the resin protective projections. The memory card 105 is located on the printed board 2 and, though not shown, the lower portion of the printed board 2 is supported on the frame 1. Therefore, the deformation of the protective projections 3a is prevented with the distal end lower portions 3c of the protective projections 3a in abutment against the bottom surfaces of the recesses 105a of the memory card 105, which in turn support the external force. In this state, the upper cover 10 does not press the contacts 4, because the positional relation between the contacts 4 and the protective projections 3a is defined so that the contacts 4 are located at a lower level than the upper surfaces 3d of the deformed protective projections 3a. As a result, no force acts on the contacts 4, so that the contacts 4 are stably kept in contact with the terminals 105b of the memory card 105.

Though not shown, spherical protuberances may be provided on the distal end lower portions 3c of the protective projections 3a so as to constantly abut against the bottom surfaces of the recesses 105a in this embodiment. Thus, the proper dimensional relation can be stably provided when the protective projections 3a abut against the bottom surfaces of the recesses 105a.

This embodiment has been described with the memory card in which the terminals 105b are provided on the bottom surfaces of the recesses 105a, but the present invention may be embodied with a memory card in which the terminals 105b are provided on the upper surface of the memory card 105. In this case, protective projections may be provided for the respective contacts, or adjacent protective projections may be combined with each other. All the protective projections for the respective contacts may be combined together, or some of the protective projections may be combined to form two or more groups of protective projections. Where all the protective projections are combined together to form one group of protective projections, for example, protective projections located apart from one position on which an external load is concentrated are liable to be pulled toward the one position and twisted. In this connection, it is preferred that the protective projections are provided separately from each other. This makes it possible to provide a highly reliable connector insusceptible to a twisting force.

In this embodiment, the protective projections provided for the respective contacts are engaged with the recesses for the respective terminals, so that the height of the protective projections is reduced. Where there is a sufficient space above the connector, the protective projections may be located at a higher level than the upper surface of the memory card and combined at a higher level than the upper surface of the memory card. In this case, all the protective projections for the respective contacts may be combined together, or some of the protective projections maybe combined. However, the height of the protective projections is increased as compared with this embodiment.

Figure 8:
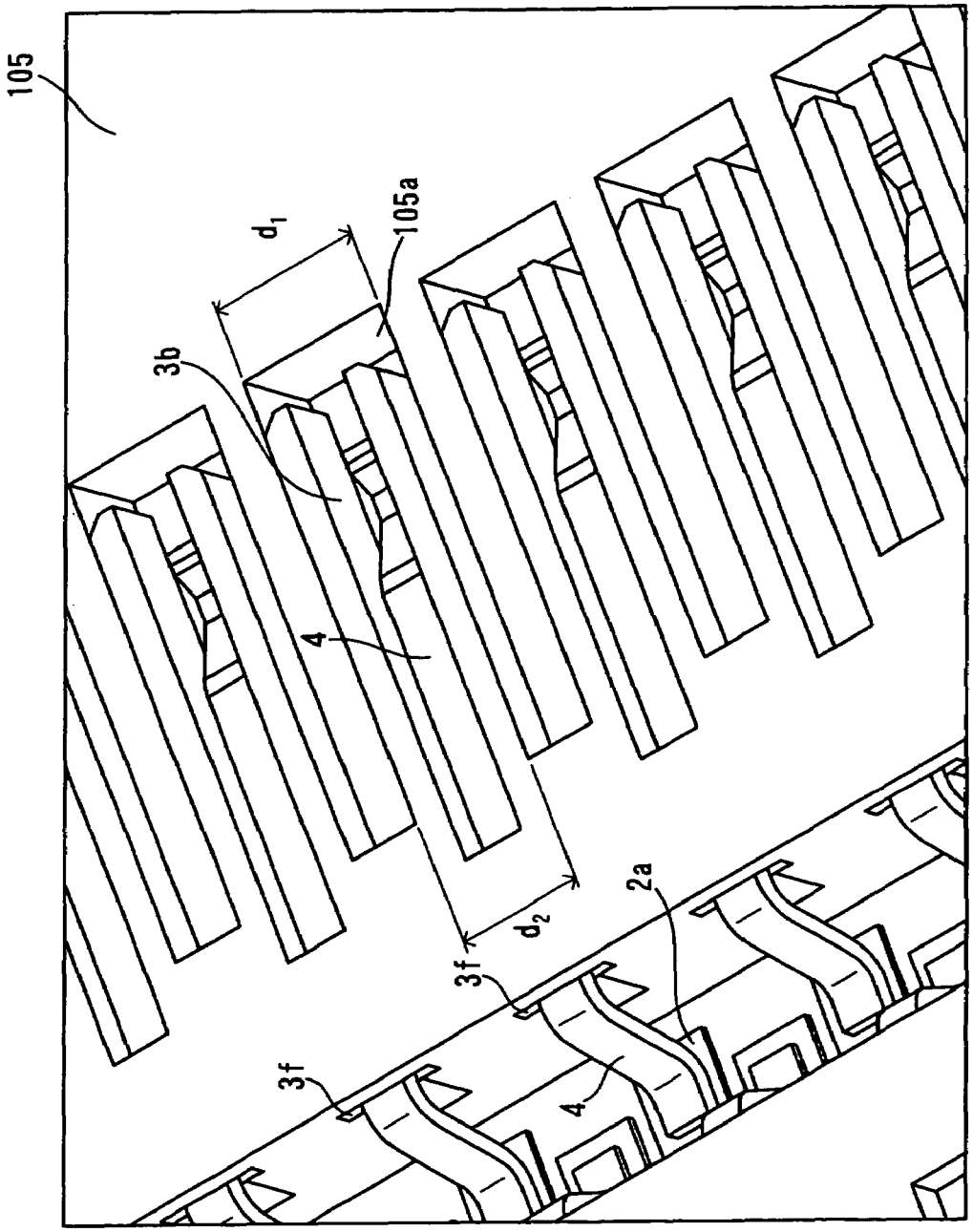
FIG. 8 is a partial enlarged view of contacts according to another embodiment of the invention.

In this embodiment, the protective projections 3a each have an elongated U-shape, but the shape of the protective projections 3a is not limited to the U-shape. The protective projections 3a may be formed in a comb shape. For example, as shown in FIG. 8, the protective projections may each include plate portions each having a predetermined thickness and projecting from the base 3 along opposite edges of the contact 4. The contacts 4 are preferably located at a lower level than the upper surfaces of the protective projections 3a, and the distal ends 4a of the contacts 4 are preferably located at a higher level than the lower surfaces of the protective projections. The contacts 4 and the protective projections 3a are located in the same positional relation as described above.

Figure 9:
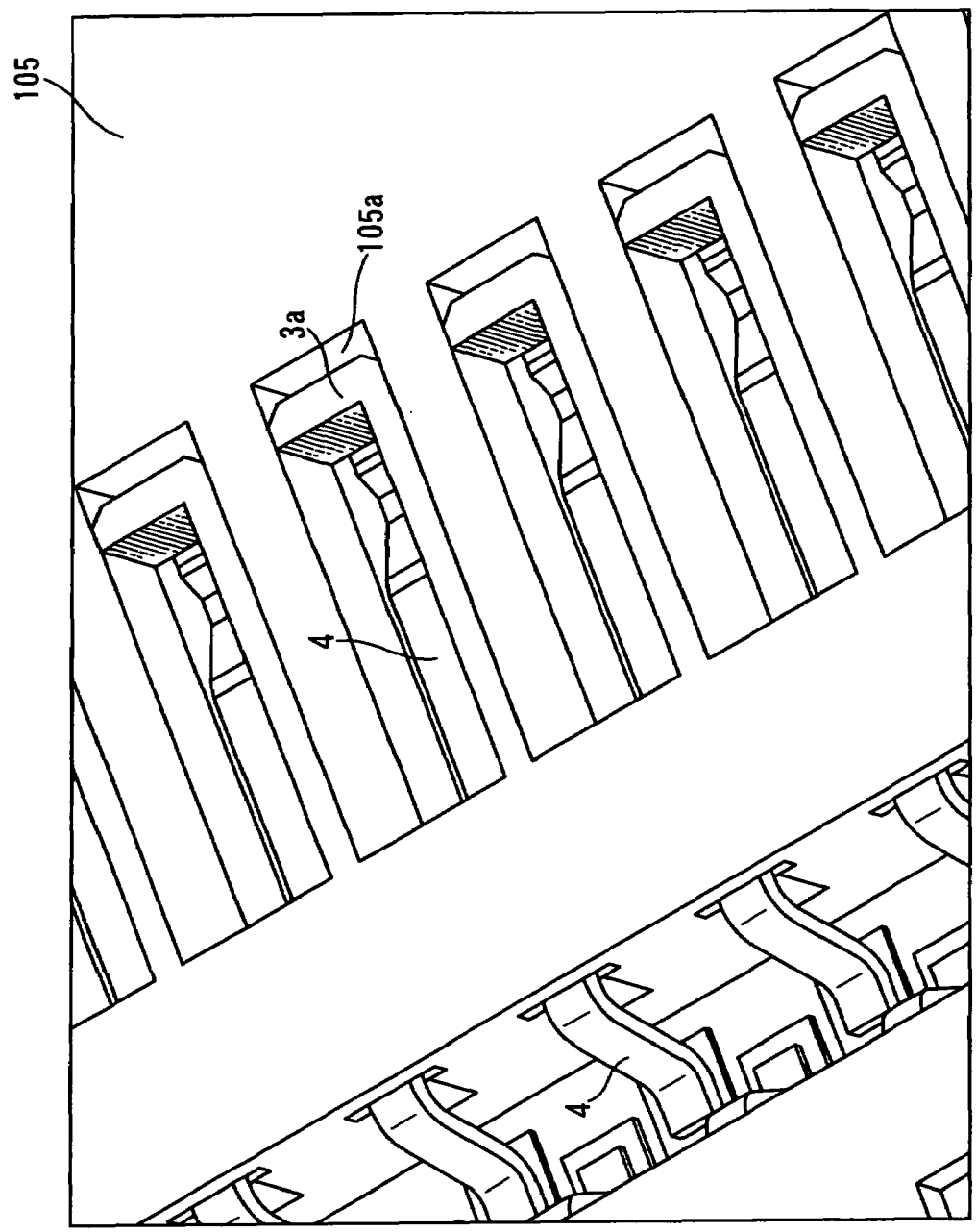
FIG. 9 is a partial enlarged view of contacts according to further another embodiment.
Figure 10:
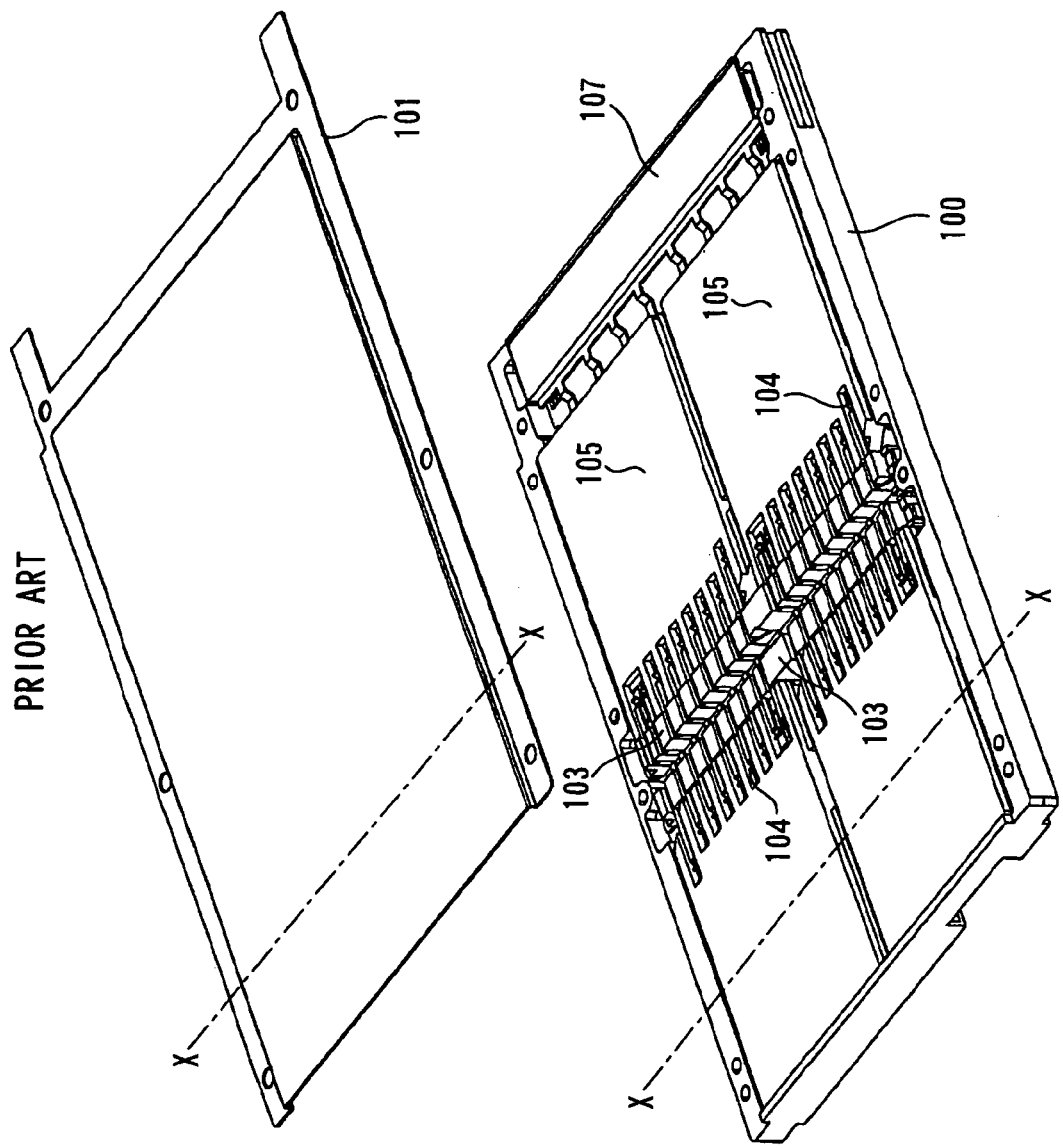
FIG. 10 is a perspective view of a prior art memory pack with its upper cover removed.
Figure 11:
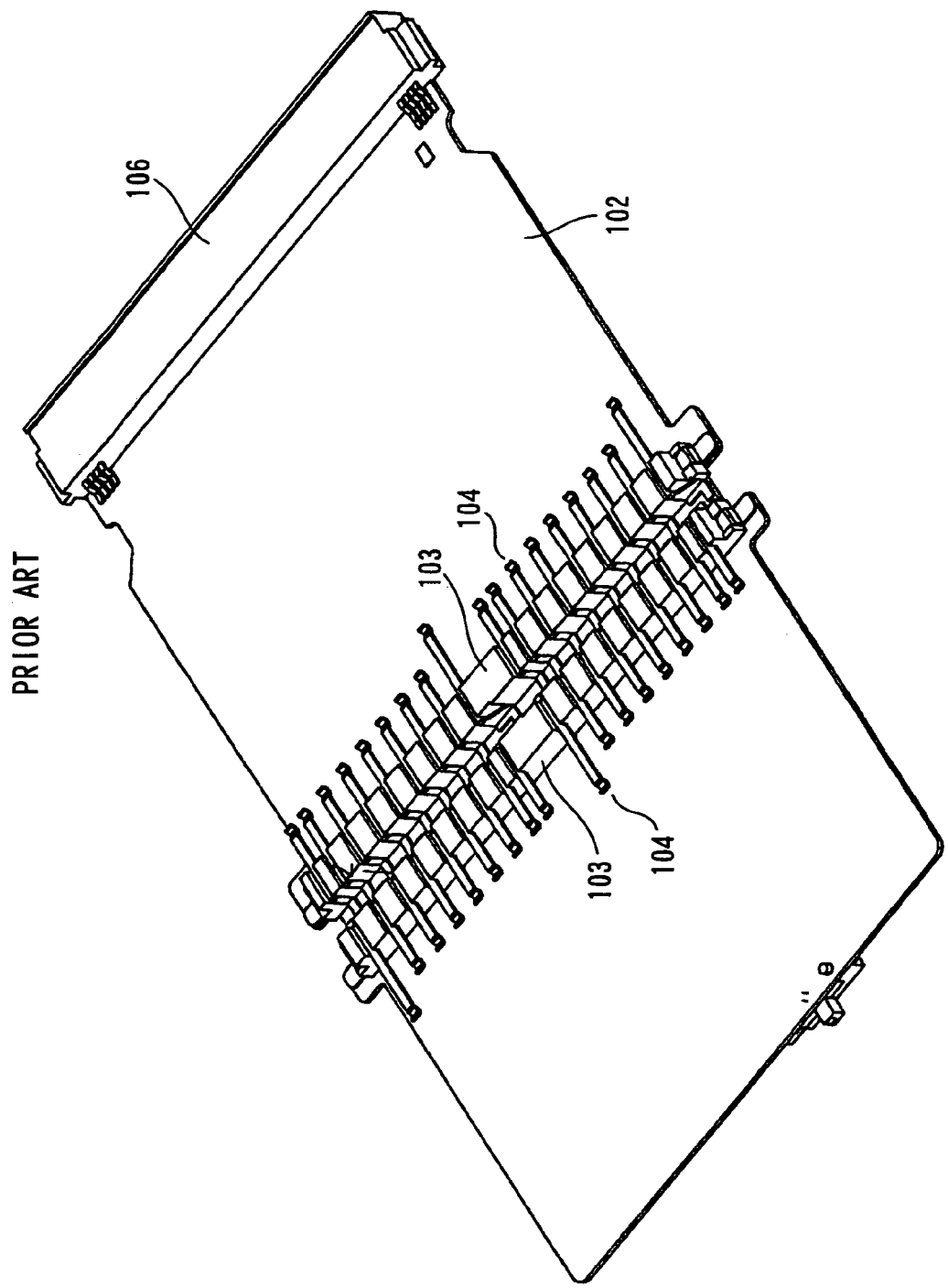
FIG. 11 is a perspective view of a printed board and a connector according to the prior art.
Figure 12:
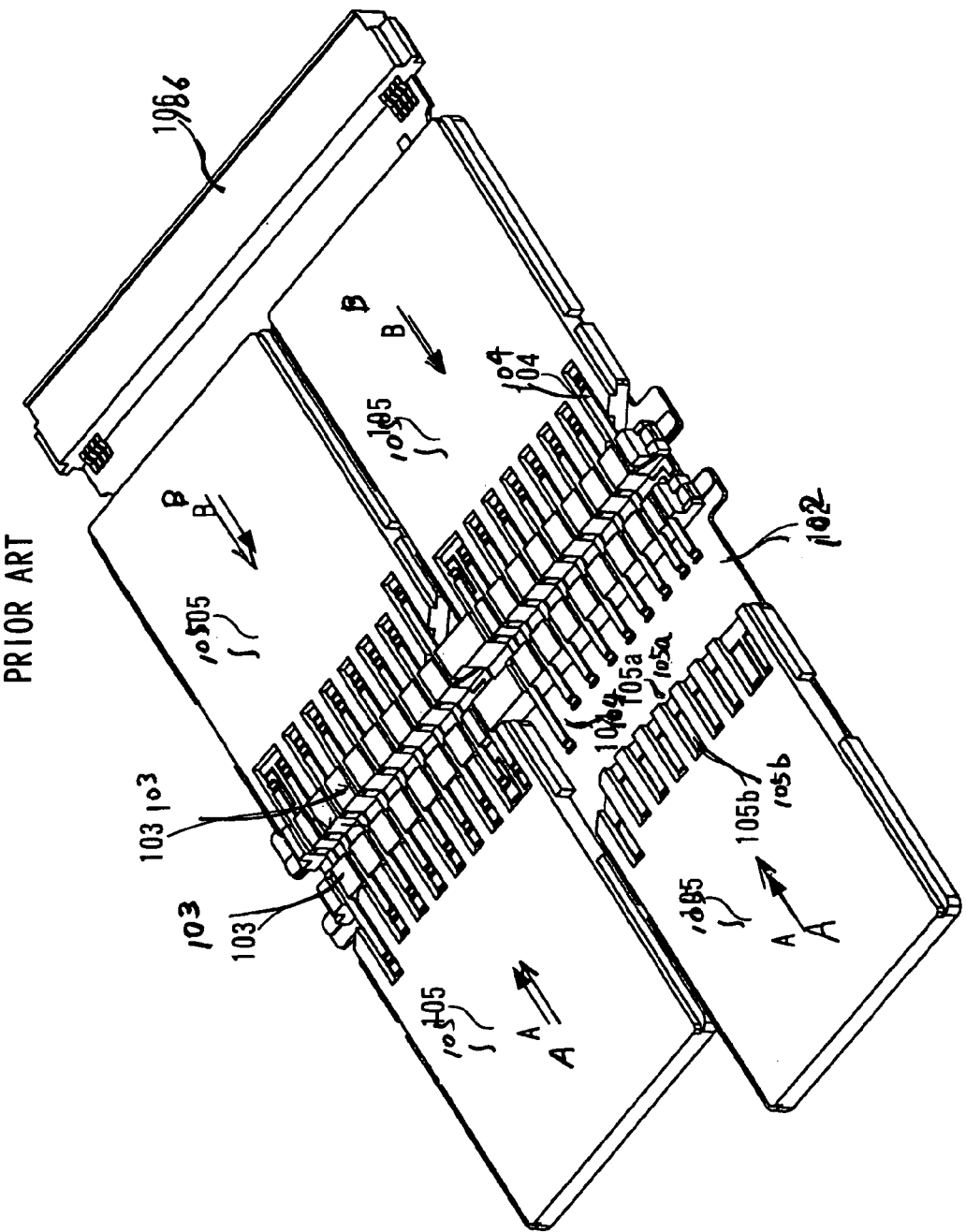
FIG. 12 is an explanatory diagram for assembling the prior art memory pack.
Figure 13:
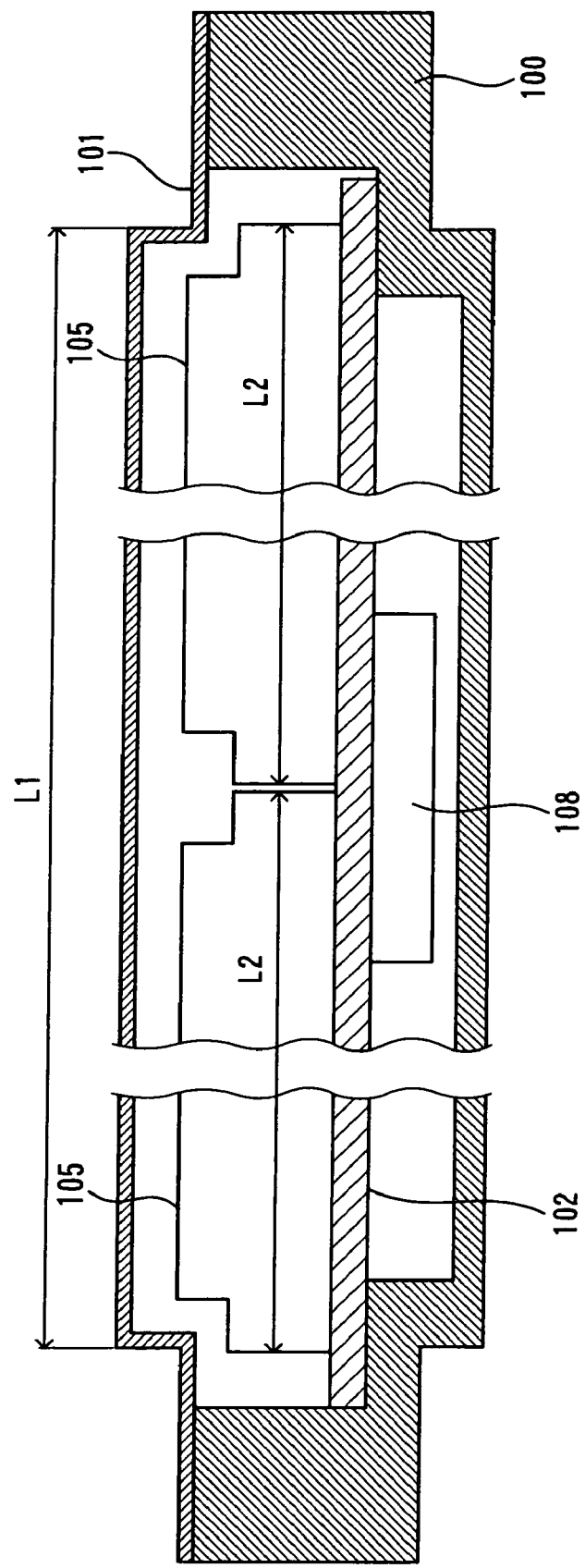
FIG. 13 is a sectional view of the prior art memory pack.

As shown in FIG. 9, the protective projections 3a may each have an L-shape and project from the base 3 along the contacts 4.

In the embodiment described above, the protective projections 3a may each have an open upper surface or a closed upper surface.

In this embodiment, the SD memory cards are used as the memory cards, but the memory cards are not limited to the SD memory cards. The number of the memory cards is four, but not limited to four. Further, the memory pack is not limited to the PC card.

INDUSTRIAL APPLICABILITY

The inventive memory pack can be assembled with a higher level of reliability, and is useful for a thin portable information device which is required to stably operate even if an external force is applied thereto during use.

The invention claimed is:

1. A memory pack for holding a memory card comprising:
a frame defining a housing;
a printed board fixed in the frame;
a connector comprising a base fixed to the printed board;
a plurality of contacts projecting from the base, substantially parallel to the printed board and arranged parallel to one another; and
protective projections extending from the base, substantially parallel to the contacts to permit movement of the contacts in a direction normal to the base, the contacts located below upper surfaces of the protective projections, with ends of the contacts extending from the base to above lower surfaces of the protective projections,
wherein the protective projections respectively have openings, and the contacts are located in the respective openings such that the contacts can move in a normal direction, and the protective projections each have a U-shape with the tops of the "U" affixed to the base to surround the respective contacts.

2. The memory pack as set forth in claim 1, wherein terminals of a memory card are in bottom portions of recesses in the memory card below the upper surface of the memory card, and the protective projections each have a smaller width than the recesses and are fitted in the recesses of the memory card, wherein the protective projections are configured such that a height of the lower surfaces of the protective projections as measured from the printed board is greater than a height of the terminals as measured from a lower surface of the memory card.

3. The memory pack as set forth in claim 2, wherein the contacts are below the upper surfaces of the protective projections when the protective projections are deformed toward the printed board against the bottom portions of the recesses of the memory card.

4. The memory pack of claim 1, further comprising at least one memory card on the printed board with terminals in contact with the contacts.

5. The memory pack of claim 4, wherein, before and after inserting the memory card, the contacts are located below upper surfaces of the protective projections, with ends of the contacts extending from the base to above lower surfaces of the protective projections.

6. A memory pack comprising:
a frame defining a housing;
a printed board fixed in the frame;
a connector comprising a base fixed to a generally middle portion of the printed board;
contacts projecting from the base, substantially perpendicular to the base and substantially parallel to the printed board and arranged parallel to one another;
protective projections extending from the base, generally parallel to the contacts to permit movement of the contacts in a direction normal to the base, the contacts located below upper surfaces of the protective projections, with ends of the contacts extending from the base to above lower surfaces of the protective projections; and
at most two pairs of memory cards on opposite sides of the connector with one side of each memory card adjacent to the printed board and an opposite side with terminals facing up in contact with the contacts,
wherein the terminals of the memory card are in bottom portions of recesses in the memory card below the upper surface of the memory card, and the protective projections each have a smaller width than the recesses and are fitted in the recesses of the memory card, wherein the protective projections are configured such that a height of the lower surfaces of the protective projections as measured from the printed board is greater than a height of the terminals.

7. The memory pack as set forth in claim 6, wherein the protective projections respectively have openings, and the contacts are located in the respective openings such that the contacts are movable in said normal direction.

8. A memory pack for holding a memory card comprising:
a frame defining a housing;
a printed board fixed in the frame;
a connector comprising a base fixed to the printed board;
a plurality of contacts projecting from the base, substantially perpendicular to the base and substantially parallel to the printed board and arranged parallel to one another; and
protective projections extending from the base, substantially parallel to the contacts, to permit movement of the contacts in a direction normal to the base, each contact being protected by one projection, the contacts located below upper surfaces of the protective projections, with ends of the contacts extending from the base to above lower surfaces of the protective projections,
wherein the protective projections respectively have openings, and the contacts are located in the respective openings such that the contacts are movable in said normal direction, and the protective projections each have a U-shape with the tops of the "U" affixed to the base to surround the respective contacts.

* * * * *